March 8, 1960     K. J. STALLER     2,927,953

ELECTRICAL LEAD CONDUCTOR

Filed Jan. 28, 1957

INVENTOR.
KAREL J. STALLER
BY
ATTORNEY

United States Patent Office 2,927,953
Patented Mar. 8, 1960

2,927,953

ELECTRICAL LEAD CONDUCTOR

Karel J. Staller, Rutherford, N.J., assignor to International Telephone and Telegraph Corporation, New York, N.Y., a corporation of Maryland Application January 28, 1957, Serial No. 636,631

4 Claims. (Cl. 174—69)

This invention relates to electrical lead conductors and more particularly to flexible conductors having heavy current carrying capacity and good heat dissipating and conducting properties.

One of the problems encountered in the construction of, for example, power diodes, in which the rectified current may be as high as 250 amperes or more, is the design of the flexible lead or connection employed within the diode structure. Since the length of this lead determines to a large extent the overall dimensions of the diode, it is obviously desirable that it should be made as short as possible and have good current carrying capacity, but at the same time it should be flexible and have good heat dissipating and conducting properties.

A particular object of my invention, therefore, is the provision of an electrical lead conductor which satisfactorily meets all these requirements. According to my invention an electrical lead conductor is formed by providing a metal strip with transverse slits, rolling the strip into a cylindrical form and then by any suitable means causing the sections of the strip located between the slits to bulge outwardly with respect to the axis of the form.

According to a further feature of my invention a conductor lead comprises a metal strip provided with a plurality of transverse slits and rolled into a tight spiral form, the sections of the strip located between the slits being outwardly bent to form an annular bulge intermediate the ends of the spiral or cylindrical form.

These and other features will be better understood from the following description of a number of preferred methods of carrying out my invention read in conjunction with the accompanying drawings in which.

A preferred method of constructing the lead conductor will first be described with reference to Figs. 1 to 4.

Figure 2:
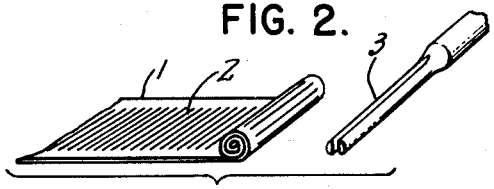
Figure 3:
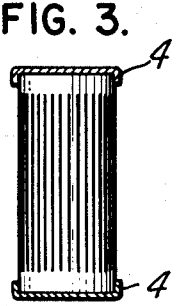

A thin strip 1 of copper, silver or other material having good conducting properties is first stamped or otherwise cut with closely and regularly spaced parallel slits 2 extending across the width of the strip. One end of the strip 1 is then inserted between the fingers of a split pin 3, such as is illustrated in Fig. 2, and the strip is wound, as shown in this figure, into a relatively tight cylindrical form or roll. Other methods may, of course, be employed for manually or automatically rolling the strip. Two metal end caps 4 are now soldered or otherwise applied to the ends of the roll. These end caps 4 serve the double purpose of holding the strip in its rolled up condition and of furnishing terminal contacts on the lead conductor. Instead of providing end caps, such as 4, the ends of the roll may be dipped in solder or otherwise secured to prevent the form from unrolling.

Figure 4:
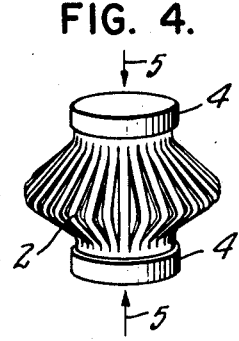

Finally, the ends of the roll are compressed, manually or automatically, in the directions of the arrows 5, Fig. 4, causing the strips between slits 2 to bulge out and the slits to widen in the manner of a Chinese lantern whereby a considerable measure of flexibility is imparted to the lead conductor. It will be noted also, that the spreading of the slits 2 provides a multiplicity of passages for air or other gases and assists in the dissipation of heat from the lead conductor.

Figure 5:
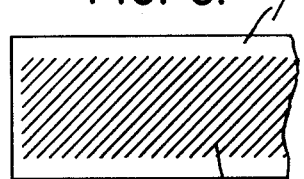
Figs. 5 and 6 are provided to illustrate an alternative construction of lead conductor and the method of making the same.
Figure 6:
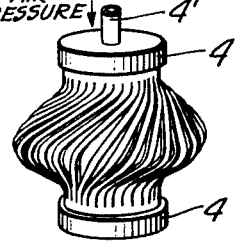

In the modified method illustrated in Figs. 5 and 6, the slits 2 in the strip 1 are cut to extend at an inclined angle with respect to the edges of the strip. The procedure for forming the lead conductor is the same as above described in connection with Figs. 1 to 4, except that in the final step air under pressure is injected into the interior of the roll through a tube 4' which enters a hole in the upper cap, in order to produce the lantern effect intermediate the ends of the conductor. It will be appreciated, of course, that the lantern effect may also be produced by pressing the end towards one another and at the same time imparting a slight twisting motion.

Figure 7:
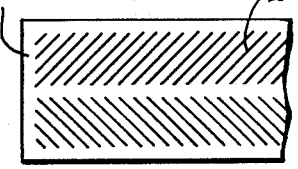
Figs. 7 and 8 illustrate a still further embodiment of my invention.
Figure 8:
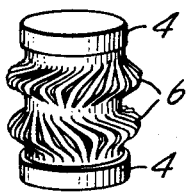

Figs. 7 and 8 illustrate a further embodiment of my invention in which the slits 2 in the strip 1 are cut in the form of a "herring bone" pattern. In this case when the caps 4 are compressed and simultaneously a slight twisting motion imparted to the cylindrical form, a pair of annular bulges 6 are formed, as illustrated in Fig. 8.

In each of the above described methods, the strip 1 may be slightly stretched before it is rolled in order to open the slits 2 to any desired extent. To permit this stretching it may be necessary to provide a number of cuts along the edges of the strip.

Figure 9:
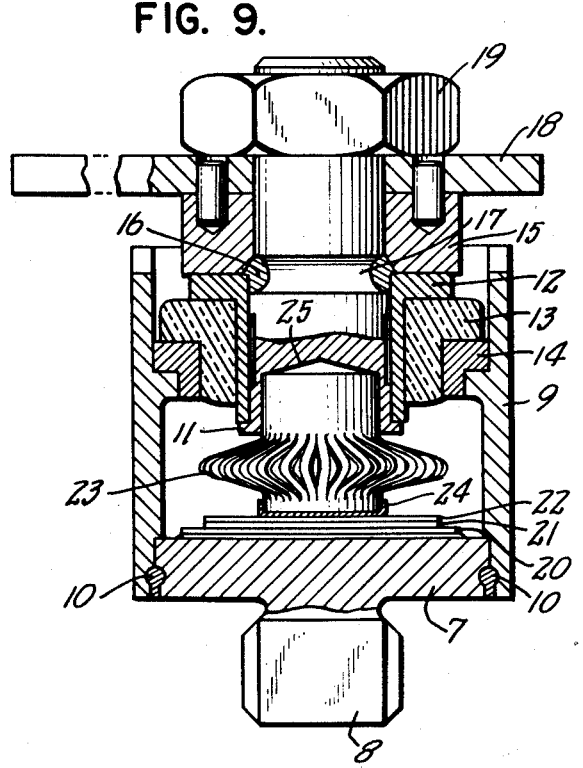
Fig. 9 is a part sectional view of a high power diode incorporating a lead conductor according to my invention.

Fig. 9 illustrates how a lead conductor may, according to my invention, be embodied in the structure of a high power diode rectifier. It will be understood, however, that this is given purely by way of example, and that my invention finds application in a multiplicity of electrical and electronic equipment and apparatus.

Referring to Fig. 9, the diode structure shown on an enlarged scale comprises a circular copper base 7, formed with a terminal or mounting stud 8. A cylindrical copper housing 9 is mounted on the base 7, adjacent surfaces of the elements 7 and 9 being formed with annular grooves 10 into which solder is run to form a gas tight joint. A copper cooling and mounting rod 11 is secured and positioned in the housing 9 by means of a "Kovar" bushing 12, a ceramic insert 13, and a "Kovar" sealing ring 14. A copper mounting ring 15 is positioned above the bushing 12, solder or other sealing material 16 being run into an annular groove 17 in the rod 11. A copper electrode 18 is placed over the end of the rod 11 and bolted to the ring 15. The upper end of the rod 11 is threaded and a brass nut 19 applied to hold the upper electrode structure together.

A rectifier element of any suitable type comprising a base plate 20, a layer of semi-conductor 21 and a counter electrode 22, is mounted on the upper surface of the base 7.

Figure 1:
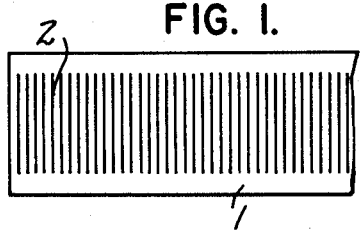
Figs. 1 to 4 illustrate four steps in the practice of a preferred method of forming a lead conductor according to my invention.

A flexible lead 23 of the kind described with reference to Figs. 1 and 4, is employed to connect the counter-electrode 22 to the rod 11 and thereby to the electrode 18. The lower end of the lead conductor 23 is provided with a cap 24, which is secured to the counter-electrode of the rectifier in any suitable manner, whilst the upper end of the conductor 23 is secured in a shallow cylindrical bore 25 machined in the lower end of the rod 11. It will be noted that the employment of a lead conductor according to my invention, makes it possible to use a very short lead conductor and permits a considerable reduction in the vertical dimension of the rectifier.

While I have described above the principles of my invention in connection with specific apparatus, it is to be clearly understood that this description is made only by way of example and not as a limitation to the scope of my invention.

What is claimed is:

1. An electrical lead conductor comprising a metal strip provided with a plurality of transverse slits in the form of a multilayer cylindrical roll, the sections of said strip between said slits extending outwardly to form an annular bulge intermediate the ends of said cylindrical form.

2. An electrical lead conductor according to claim 1, further comprising a terminal member secured over at least one end of said cylindrical form.

3. An electrical lead conductor according to claim 1, in which said slits are inclined with respect to the edges of said strip.

4. An electrical lead conductor comprising a metal strip formed with a plurality of rows of transverse parallel slits and multilayer cylindrical roll, the sections of said strip between said slits extending outwardly to form a plurality of annular bulges intermediate the ends of said cylindrical form.

References Cited in the file of this patent

UNITED STATES PATENTS

| | | |
|---|---|---|
| 1,927,247 | Squiers | Sept. 19, 1933 |
| 2,009,496 | Johnson | July 30, 1935 |
| 2,036,759 | Kleinmann | Apr. 7, 1936 |
| 2,239,331 | Mebold | Apr. 22, 1941 |
| 2,486,285 | Hurst | Oct. 25, 1949 |
| 2,693,022 | Gurewitsch et al. | Nov. 2, 1954 |
| 2,695,329 | Sabine | Nov. 23, 1954 |
| 2,779,993 | Pityo | Feb. 5, 1957 |
| 2,780,667 | Cataldo et al. | Feb. 5, 1957 |

FOREIGN PATENTS

| | | |
|---|---|---|
| 140,394 | Sweden | May 19, 1953 |
| 83,864 | Norway | June 28, 1954 |